UNITED STATES PATENT OFFICE.

LEOPOLD TRUNKHAHN, OF VIENNA, AUSTRIA-HUNGARY.

BATH FOR OBTAINING ELECTROLYTIC METALLIC DEPOSITS.

No. 868,729.  Specification of Letters Patent.  Patented Oct. 22, 1907.

Application filed June 4, 1906. Serial No. 320,165.

*To all whom it may concern:*

Be it known that I, LEOPOLD TRUNKHAHN, official, a citizen of the Empire of Austria, residing at Vienna, Austria-Hungary, have invented certain new and useful Improvements in Baths for Obtaining Electrolytic Metallic Deposits, of which the following is a specification.

In order to increase the adhesion and the luster of electrolytic metallic deposits, sugars or vegetable saps containing sugar have been mixed with the baths. It has, however, been found that the favorable influence of the addition of sugar only lasts for a short time, and only shows itself again when the bath has remained at rest for a long period.

As a result of experiments undertaken in this connection I have discovered that the favorable influence of the addition of sugars or of vegetable saps containing sugar is largely increased and maintained constant when there is added to the latter a ferment, such, for example, as yeast or barm. The present invention is founded upon this discovery.

In the practice of this invention, I employ any bath adapted for use in electro-deposition of metals and to this I add one or more of the sugars or I may add one or more of the vegetable saps containing sugar; it being understood that by the term sugars, as herein employed, I refer generically to the class of bodies known by this term, such, for example, as maltose, dextrose and the like, or solutions thereof, as vegetable saps. I also add a small amount of some ferment as yeast or barm and employ the bath in the usual way.

A bath containing the following materials in substantially the proportions specified will serve as an example of one bath admirably adapted for use in the practice of my process. 25 kilograms of crystallized sulfate of zinc, 15 kilograms of aluminium sulfate, 1 kilogram of calcium carbonate, 4 kilograms of maltose or dextrose, and 0.5 kilograms of beer barm.

Having now particularly described the nature of my invention, what I claim is:

A bath for producing electrolytic metallic deposits comprising one or more sugars and a ferment, substantially as described.

In testimony whereof I hereunto affix my signature in presence of two witnesses.

LEOPOLD TRUNKHAHN.

Witnesses:
FRIEDRICH BINDER,
ALVESTO S. HOGUE.